(12) United States Patent
Glaab

(10) Patent No.: US 12,077,249 B1
(45) Date of Patent: *Sep. 3, 2024

(54) METHOD AND APPARATUS FOR UNLOADING FISHING VESSELS

(71) Applicant: Circle Seafoods, Inc., Portland, OR (US)

(72) Inventor: Gene Patrick Glaab, Sitka, AK (US)

(73) Assignee: Circle Seafoods, Inc., Portland, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/239,688

(22) Filed: Aug. 29, 2023

Related U.S. Application Data

(63) Continuation of application No. 18/132,933, filed on Apr. 10, 2023, now Pat. No. 11,745,833.

(51) Int. Cl.
| | |
|---|---|
| *B63B 21/20* | (2006.01) |
| *A01K 97/20* | (2006.01) |
| *B63B 21/16* | (2006.01) |
| *B63B 27/30* | (2006.01) |
| *B63B 35/14* | (2006.01) |

(52) U.S. Cl.
CPC .............. *B63B 21/20* (2013.01); *A01K 97/20* (2013.01); *B63B 21/16* (2013.01); *B63B 27/30* (2013.01); *B63B 35/14* (2013.01); *B63B 2021/203* (2013.01)

(58) Field of Classification Search
CPC ......... B63B 21/20; B63B 21/16; B63B 27/30; B63B 35/14; B63B 2021/203; A01K 97/20
See application file for complete search history.

(56) References Cited

U.S. PATENT DOCUMENTS

| | | | |
|---|---|---|---|
| 3,251,332 A | 5/1966 | Vassar | |
| 4,480,574 A | 11/1984 | Bertrams | |
| 4,666,127 A * | 5/1987 | Allen | B63B 27/18 |
| | | | 254/281 |
| 4,726,315 A | 2/1988 | Bell et al. | |
| 11,745,833 B1 * | 9/2023 | Glaab | B63B 21/16 |
| | | | 114/230.15 |
| 2015/0156998 A1 | 6/2015 | Terry | |

OTHER PUBLICATIONS

Notice of Allowance for U.S. Appl. No. 18/132,933, mailed Jun. 30, 2023, 8 pages.

* cited by examiner

*Primary Examiner* — Stephen P Avila
(74) *Attorney, Agent, or Firm* — Elliot, Ostrander & Preston, P.C.

(57) ABSTRACT

A line hauler on a fish tender vessel is mounted to a port or starboard quarter location of a deck of the vessel. A loop of floating line is wrapped around the line hauler, extends toward the bow of the vessel to a pulley mounted on a respective port or starboard side, then extends down to the sea, then extends on the surface of the sea adjacent the respective port or starboard side to at least the location where the line hauler is mounted to the deck, and then extends from the surface of the sea back to the line hauler. The loop of line moves in a circle when the line hauler pulls on the line. Lead lines are connected to the line. Fishing vessels attached to the lead lines are pulled alongside the respective port or starboard side of the vessel when the line hauler pulls the line.

13 Claims, 4 Drawing Sheets

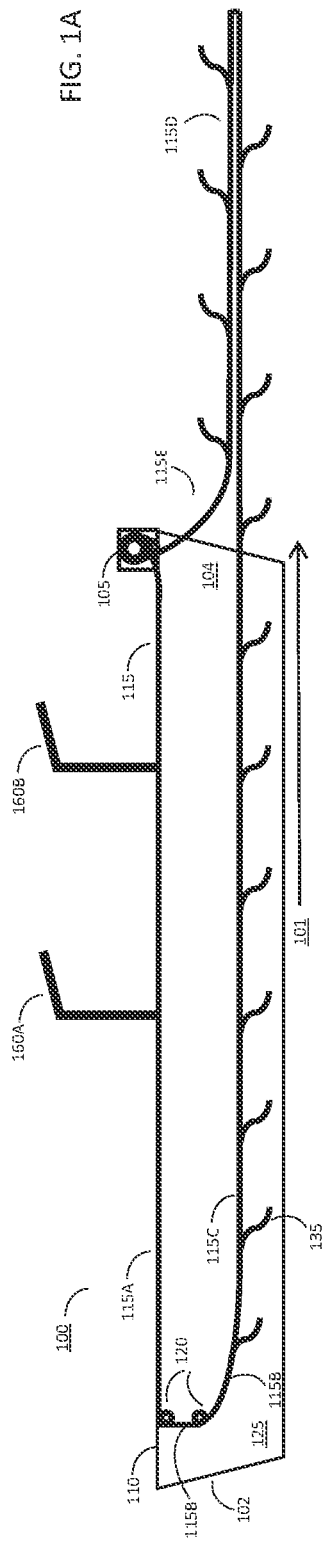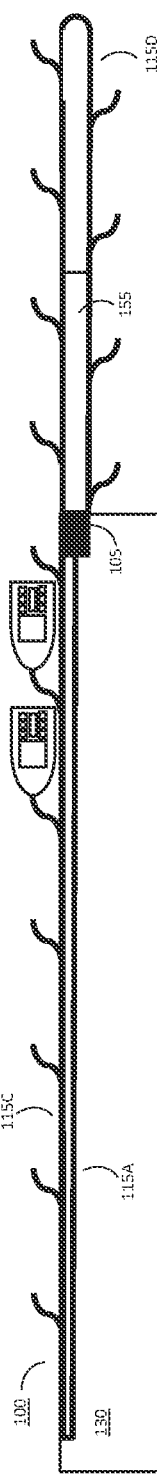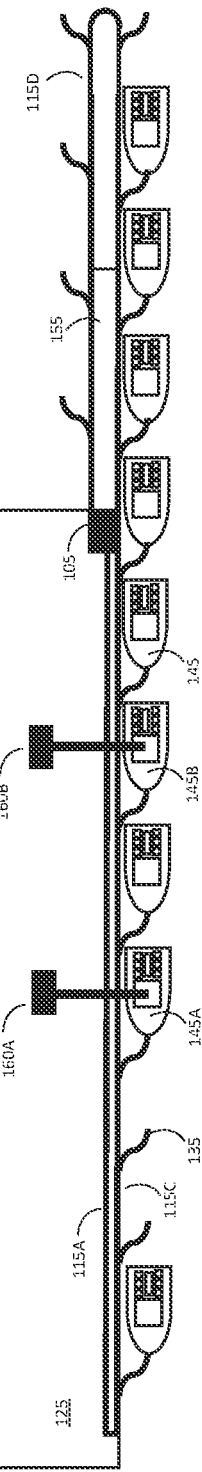
FIG. 1A
FIG. 1B

METHOD AND APPARATUS FOR UNLOADING FISHING VESSELS

CROSS-REFERENCE TO RELATED APPLICATIONS

This application is a continuation of U.S. patent application Ser. No. 18/132,933, filed on Apr. 10, 2023, scheduled to issue on Sep. 5, 2023 as U.S. Pat. No. 11,745,833, the entire contents of which is hereby incorporated by reference herein.

TECHNICAL FIELD

Embodiments of the present invention relate to loading or unloading fishing vessels.

BACKGROUND

Conventionally, fishing boats, or fishing vessels, gather periodically to unload their catch of fish to a receiving tender boat or barge, sometimes known as a mothership, hereinafter referred to as a fish tender vessel. A fish tender vessel may be more formally described as a vessel that commercially supplies, stores, refrigerates, or transports fish, fish products, or materials directly related to fishing or the preparation of fish to or from a fishing, fish processing, or fish tender vessel or a fish processing facility. When the fishing vessels gather, they coordinate among themselves, under their own power, to form a drag line, in which the fishing vessels line up in a single file line or queue and wait their turn to be unloaded. The first fishing vessel in the drag line maintains a position nearest the fish tender vessel, for example, by mooring itself via a mooring line extending from its bow to a rear quarter or stern of the fish tender vessel. The other fishing vessels are tied to the fishing vessel ahead of them, bow to stern. Fishing vessels enter at the end the line, where they tie their bow line to the stern of the last boat in the queue. The fishing vessels float or follow behind one another in a current of a body of seawater, or in a current of the fish tender vessel while underway, awaiting their turn to unload their catch of fish to the fish tender vessel, and optionally to take on provisions or supplies, such as fuel or ice.

When a loading or unloading station becomes available at the fish tender vessel, the first fishing vessel in the drag line exits the drag line by untying itself from the line of fishing vessels and then tying itself to the fish tender vessel proximate the loading or unloading station. When the first fishing vessel is done, for example, unloading fish at an unloading station, it unties from the fish tender vessel and either moves away from the fish tender vessel under its own power or moves under its own power to another, forward, station of the fish tender vessel and ties up again to conduct business at the forward station, for example, to take on fuel or ice. As the unloading station becomes free, the next fishing vessel, currently in first position in the drag line, casts off from the drag line and motors into position proximate the unloading station and then ties off to the fish tender vessel. Concurrently, the fishing vessels remaining in the drag line each motors forward under their own power until the first fishing vessel in the drag line picks up the mooring released by the previous fishing vessel. This process continues so long as there are fishing vessels in the drag line.

As can be appreciated, significant time, effort, and coordination is required among all the fishing vessels and their captains to maintain their respective positions in the drag line and to repeatedly move forward under their own power while tethered together in the drag line. This is particularly the case when conditions are difficult, e.g., currents are strong, winds are high, and the seas are rough, or when such conditions change.

Yet, the above-described process has been in place, unchanged, for over seventy years, since the early 1950s when electric motored boats were first introduced. In the Alaskan fisheries industry, there may be 1400 or so fishing boats on the water during a fishing season, with a hundred or so of such boats trying to unload their catch at the same time to a fish tender vessel or the like. Moreover, given the extensive tidal flats in Alaska, most fishing boats are launched via a trailer, not via a dock. As a result, most Alaskan fishing boat captains do not have much experience docking boats and/or maneuvering around other fishing boats. Additionally, during a fishing season, the captain and crew work on their boat, for example, twenty days straight, with two 10-hour shifts each day and two hours between those shifts to unload their catch and get back out to fish. Not surprisingly, the combination of the captains' lack of seamanship, sleep deprivation and fatigue can cause great difficulties when fishing boats gather in significant numbers and crowd around a fish tender vessel to unload. In fact, it is not uncommon for fishing boat owners to need to repair or replace components of their boats, e.g., the deck railings, every season due to damage that occurred to their boats resulting from repeatedly banging into other boats during unloading activities the previous season. What is needed is a faster, safer, more efficient way to unload catch from fishing vessels, and for the fishing vessels to take on supplies or provisions, so they can return to sea as quicky as possible to continue fishing while the fishing season, and environmental conditions, permit doing so. Embodiments of the invention described herein address these long-felt but unsolved needs.

BRIEF DESCRIPTION OF THE DRAWINGS

Embodiments of the present disclosure are illustrated by way of example, and not by way of limitation, and can be more fully understood with reference to the following detailed description when considered in connection with the figures in which:

FIGS. 1A and 1B illustrate embodiments of the invention.

DETAILED DESCRIPTION

According to embodiments of the invention, a line hauler on a fish tender vessel is mounted to a port or starboard quarter location of a deck of the vessel. A loop of floating line is wrapped around the line hauler, extends toward the bow of the vessel to a pulley mounted on a respective port or starboard side, then extends down to the sea, then extends on the surface of the sea adjacent the respective port or starboard side to at least the location where the line hauler is mounted to the deck, i.e., to at least a location on the surface of the sea substantially below the location where the line hauler is mounted to the deck, and then extends from the surface of the sea back to the line hauler. The loop of line moves in a circular direction when the line hauler pulls the line. Lead lines are connected to the line. Fishing vessels attached to the lead lines are pulled alongside the respective port or starboard side of the vessel when the line hauler pulls the line, and once in position near an unloading station of the vessel, the line hauler stops pulling the line, and the fishing vessels' crews work with the vessel crew to unload their catch of fish.

Figure 2:
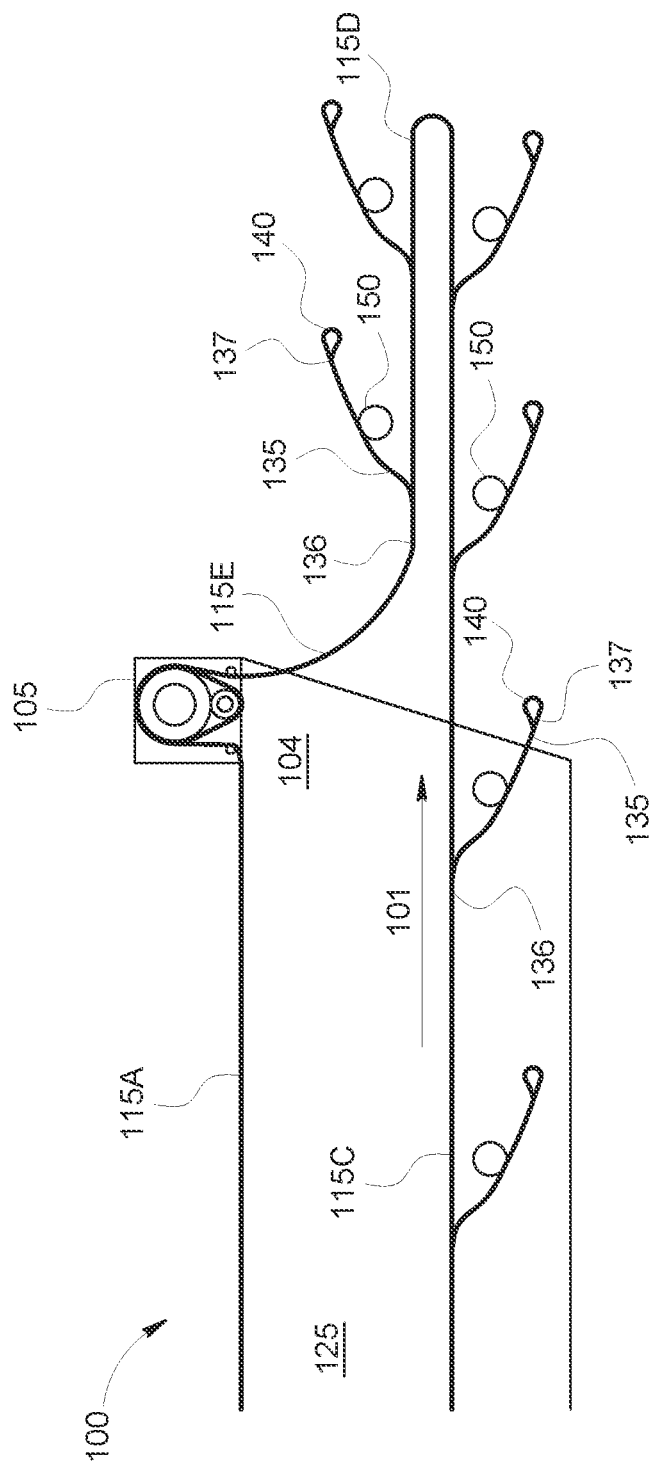
FIG. 2 illustrates an embodiment of the invention.

With reference to FIGS. 1A, 1B and 2, a fish tender vessel, a fish processing facility, or a barge (hereinafter, "the vessel") 100 is anchored at a bow or foredeck 102 of the vessel to allow the vessel to pivot in, and thereby align with, a direction of current 101 in a body of seawater. Alternatively, the vessel 100 maintains a position with the bow pointed into an oncoming current in a body of seawater to align the vessel with the current. The vessel 100 includes a power source (not shown), such as an electric motor or a hydraulic pump, by which to operate a winch or a mechanical line hauler (hereinafter "line hauler") 105. The line hauler 105, according to an embodiment, and as illustrated in the figures, is mounted on the deck 110 at a stern 104 of the vessel 100, for example, mounted to a port, or a starboard, quarter location of the deck of the vessel, and coupled to the power source. In one embodiment, the line hauler 105 is a purse seine winch such as the Marco PKW20 Purse Winch available from Smith Berger Marine, Inc., Seattle WA. The PKW20 Purse Winch features a dual sheave design, which allows for easy passage of splices, knots, and links in a line that wraps around an inside sheave and then comes around an outer sheave for a second wrap that takes the slack and maintains traction on the line in the inside sheave. The extra traction provided by the outer sheave allows the operator to start and stop pulling the line, and even reverse the winch to safely pay out line under tension.

A line 115 is wrapped around the line hauler 105, then extending in a first portion of the line 115, designated 115A, toward the bow 102 of the vessel. The line 115 then changes direction as it moves past one or more wheels, e.g., pulleys 120, mounted on a respective port side 125 or starboard side 130 of the vessel 100. The pulleys 120 support movement of, and a change in the direction of force applied to, the line 115. In one embodiment, a davit, davit crane, davit roller assembly, crane, or the like, may be used instead of one or more pulleys. The line 115 extends past the pulleys in a downward direction in a second portion of the line 115, designated 115B, to a surface of the body of seawater. The line 115 then changes direction again, given the direction of the current of the body of seawater—in the direction 101 from bow to stern of the vessel—that pulls on the line, extending on the surface of the body of seawater adjacent the respective port side 125 or starboard side 130 of the vessel 100 to at least the port or the starboard quarter location at which the line hauler 105 is mounted to the deck 110 of the vessel in a third portion of the line 115, designated 115C. In one embodiment, the line 115 is a floating line, having a diameter of 1 and ¼ inches, to facilitate extension of the line on the surface of the body of seawater, given the line floats. In another embodiment, small buoys, or floats 150 may be attached to the line 115 so that that portion 115C floats on the surface of the seawater. This makes it easier for a boat's crew to see the line on the surface of the seawater and prevent the line from being caught in the boat's propeller(s). The line 115 then extends from the surface of the body of seawater back to the line hauler, in a fourth portion of the line 115, designated 115E. Thus, the line forms a loop that moves along its length, i.e., the line circles around, when the line hauler 105 pulls the line 115.

According to one embodiment, the third portion of the line 115, designated 115C, extending on the surface of the body of seawater adjacent the respective port side 125 or starboard side 130 of the vessel 100 to at least the port or the starboard quarter location at which the line hauler 105 is mounted to the deck 110 of the vessel, may actually extend beyond or behind the location at which the line hauler 105 is mounted to the deck 110 of the vessel, e.g., beyond the stern 104 of the vessel 100. In such an embodiment, a portion of the line 115 then loops around and extends in an opposite direction, compared to portion 115C, on the surface of the body of seawater toward the respective port side 125 or starboard side 130 of the vessel 100 as seen in FIGS. 1A, 1B and 2 in a fifth portion of line 115, designated 115D. The line 115 then extends from the surface of the body of seawater back to the line hauler, in the fourth portion of the line 115, designated 115E. Thus, the line forms a loop that moves along its length when the line hauler 105 pulls the line 115. In this embodiment, to prevent the portions 115C and 115D from getting tangled with each other, a floating boom 155, or a deck, or the like, is coupled to the stern 104 of the vessel 100 and trails the vessel given the direction of the current of the body of seawater to provide separation between the portion of the line 115 and the portion of the line 115 designated 115D.

According to embodiments, mooring lines, or lead lines 135 are coupled to the line 115. In particular, the lead lines 135 each have a first end 136 that is removably coupled to the line 115. For example, the lead lines 135 may be spliced to line 115 or coupled via a link or hook or otherwise connected to line 115. According to embodiments, the lead lines are coupled to line 115 at substantially equal distances along a length of the line, for example, every 40 feet to accommodate typical or standard size fishing vessels 145, such as 32 ft. or every 66 feet to accommodate 58 ft. fishing vessels. In one embodiment, one or more lead lines can be removed to accommodate larger fishing vessels 145, depending on the distances between adjacent or neighboring lead lines 135 coupled to the line 115 and the length of the larger fishing vessels. A second end 137 of the lead lines 135 has, or is formed into, a loop or connector 140 by which the lead lines can be removably coupled to a fishing vessel 145, for example, coupled to a mooring cleat on the bow of the fishing vessel. When a fishing vessel 145 is coupled to a lead line 135, which, in turn, is coupled to line 115, the fishing vessel is pulled alongside the respective port side 125 or starboard side 130 of the vessel 100 when the line hauler 105 pulls the line 115. Importantly, the operator of the line hauler controls the movement of the fishing vessel 145. More importantly, the operator controls the concurrent movement of multiple fishing vessels coupled to respective lead lines 135, so that the positions and movements of the fishing vessels are synchronized under central control of the line hauler. The operator of the line hauler can start and stop the line hauler, and in so doing, can start and stop pulling line 115, to move and hold or maintain the fishing vessels into and at respective positions or locations, for example, positions or locations next to, adjacent, or proximate loading or unloading stations of the vessel 100.

In one embodiment, the lead lines 135 comprise floating lines, and/or have a pickup buoy 150 coupled thereto, so that the lead lines float on the surface of the body of seawater and facilitate a crew on a fishing vessel 145 to see and pick up a lead line 135 and mooring the fishing vessel to the lead line 135. This also prevents the line from becoming submerged and accidentally being caught in the boat's propeller(s).

Figure 3:
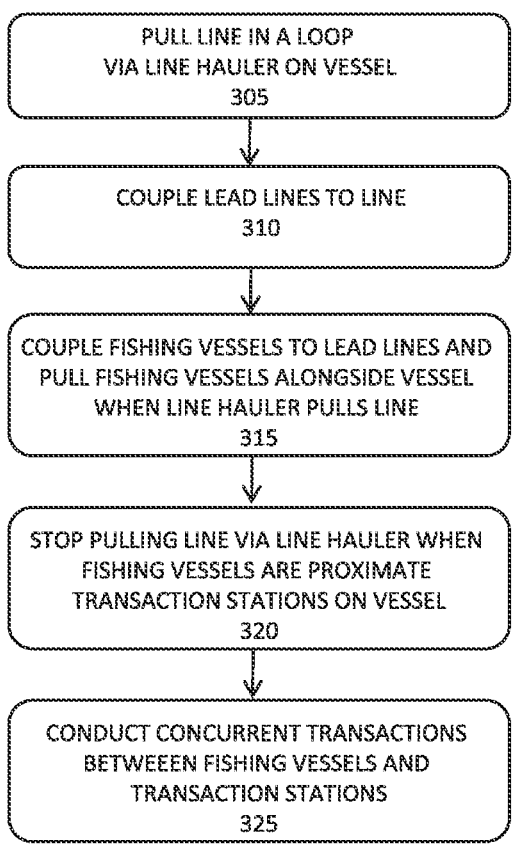
FIG. 3 is a flowchart of a method embodied in the invention.
Figure 4:
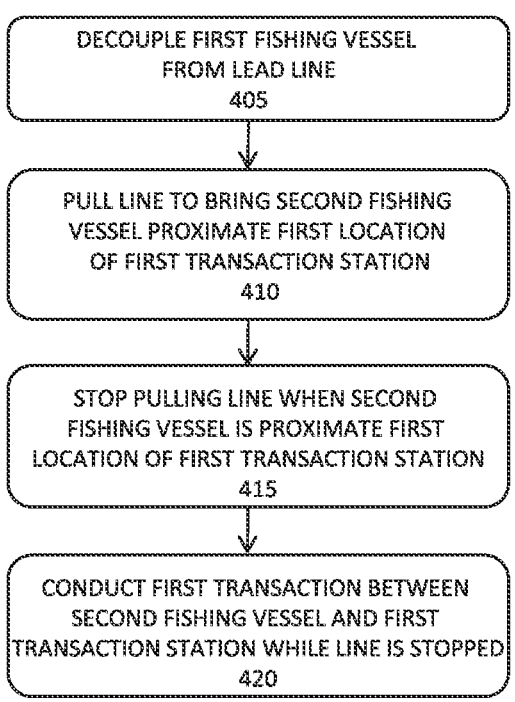
FIG. 4 is a flowchart of a method embodied in the invention.

With reference to FIGS. 3 and 4, one method for pulling fishing vessels 145 alongside a port side 125 or starboard side 130 of the vessel 100, according to embodiments of the present disclosure, involves anchoring the bow 102 or foredeck of the vessel 100 in the body of seawater to allow the vessel to pivot in, and thereby align with, a direction of the current of the body of seawater. In another embodiment, the vessel is maintained in a position such that the bow 102 of the vessel 100 is pointed into an oncoming current of the body of seawater, for example, by steering the vessel, to align the vessel 100 in the direction of the current of the body of seawater.

The method further involves operating a line hauler 105, mounted at or near the stern 104, for example, mounted at a port, or a starboard, quarter location of the deck 110 of the vessel 100, under a motive power, whether, for example, an electric motor or a hydraulic pump. The line hauler 105 moves the line 115 along its length by operation of the line hauler engaging and pulling the line at block 305. The direction of movement of the line 115 when pulled is from bow 102 to stern 104 of vessel 100, that is, the portion of line 115 that is designated 115A moves in a direction from bow to stern of the vessel when the line hauler pulls the line 115. Of course, because of the change in direction of force in line 115 provided by pulley(s) 120, the direction of movement of the portion of line 115 that is designated 115C is from stern to bow of the vessel when the line hauler pulls line 115. Thus, fishing vessels 145, which are only ever connected to that portion of line 115 designated 115C, are brought forward alongside vessel 100 under the control and power of line hauler 105.

As noted above, line 115 extends from the line hauler toward the bow 102 of the vessel to one or more pulleys 120 mounted on a respective port side 125 or starboard side 130 of the vessel, then extends down to the surface of the body of seawater, then extends on the surface of the body of seawater adjacent the respective port or starboard side of the vessel to at least the port or the starboard quarter location at which the line hauler is mounted to the deck of the vessel, and then extends from the surface of the body of seawater back to the line hauler. At block 310, lead lines 135 are coupled or decoupled at respective positions along the length of line 115. (In fact, it is probable that line 115 is initially configured when installed on vessel 100 with lead lines already coupled along the length of line 115). In particular, a first end 136 of each respective lead line 135 is coupled to the line 115. Fishing vessels 145 are coupled at block 315 to respective lead lines 135 via the second end 137 of the lead lines. In particular, fishing vessels are coupled to available lead lines 135 that are in turn coupled to the portion of line 115 designated 115C that extends on the surface of the body of seawater adjacent the respective port or starboard side of the vessel from near pulley(s) 120 to at least the port or the starboard quarter location at which the line hauler is mounted to the deck of the vessel. In this manner, the fishing vessels are pulled alongside the respective port side or starboard side of the vessel 100 when the line hauler 105 pulls the line 115.

The fishing vessels 145 are stopped and their respective positions maintained alongside the respective port side or starboard side of the vessel when the line hauler 105 stops pulling the line at block 320. The line hauler 105 stops pulling the line 115 at block 320, for example, when at least one fishing vessel 145 is adjacent to or proximate the location of a transaction station. According to the embodiments described herein, the transactions stations are positioned between the pulley(s) 120 and the line hauler 105. Examples of a transaction station include, but are not limited to, a fish unloading station, a fuel loading station, an ice loading station, a water pumping and/or water vacuum station, a payment station, and a provisions loading or unloading station. For example, the line hauler 105 stops pulling the line 115 when a fishing vessel 145A is abreast the location of transaction station 160A. The vessel 100 and the fishing vessel 145A then conduct a transaction, for example, unloading a catch of fish via a crane and/or vacuum hose.

Advantageously, the line hauler 105 stops pulling the line 115 at block 320 when at least two fishing vessels 145 are respectively adjacent the locations of two different transaction stations, so that while one fishing vessel 145 is conducting a transaction with vessel 100 at one transaction station, another fishing vessel 145 is conducting another, perhaps, different transaction with vessel 100 at a different transaction station. For example, the line hauler 105 stops pulling the line 115 when fishing vessel 145A is abreast the location of transaction station 160A and fishing vessel 145B is concurrently adjacent the location of transaction station 160B. The vessel 100 then conducts, at block 325, separate, concurrent (overlapping in time), transactions with the different fishing vessels, for example, loading fuel from vessel 100 to fishing vessel 145A at transaction station 160A while at the same time unloading a catch of fish from fishing vessel 145B to a hold in vessel 100 at transaction station 160B via, for example, a crane and/or vacuum hose. If either fishing vessel 145A or 145B finishes before the other, it can, at block 405, decouple or disconnect from its lead line 135 and move away from vessel 100 under its own power, or remain connected via its lead line 135 to line 115 so that it can move forward to another transaction station, as may be the case, when line hauler 105 pulls line 115.

While the above described embodiment contemplates two transaction stations on vessel 100, it is appreciated that there could be more than two transaction stations, and thus, the operation described above could involve concurrent transactions with more than two fishing vessels, where the movement and loading/unloading of multiple fishing vessels is completely controlled, in a synchronized fashion, by moving, and stopping, the line 115, under central control of the operator of line hauler 105.

According to embodiments, a first transaction station (e.g., station 160A) is positioned at a first location on the deck of vessel 100, and a second transaction station (e.g., station 160B) is positioned at a second location, at a distance from the first location of the first transaction station, on the deck of the vessel 100. The transaction stations may be positioned along either or both the port side 125 and starboard side 130 of vessel 100 or may be centrally located between the port and starboard sides of the vessel, so that transactions can be conducted with fishing vessels pulled alongside either or both the port side and starboard side of the vessel. It is conceivable that a single transaction station, such as a fueling station, can service two fishing vessels 145 at the same time or overlapping times, each positioned on opposite sides of vessel 100, much like two automobiles can be concurrently serviced while positioned on either side of a gasoline pumping station or island at a gas station.

According to embodiments, the lead lines 135 are coupled via the first end 136 of the respective lead line to the line 115 at substantially equal distances along a length of the line. Similarly, the distance from the first location of the first transaction station (e.g., station 160A) to the second location of the second transaction station (e.g., 160B) is equal to, or a multiple of, the substantially equal distances along the length of the line, so that first and second fishing vessels 145 connected to respective lead lines become positioned adjacent a respective first and second transaction station at the same time when pulled by line hauler 105. At such point in time, the line hauler stops pulling the line. The vessel can then conduct a first transaction between the first fishing vessel (e.g., fishing vessel 145A) and the first transaction station (e.g., station 160A), and concurrently conduct a second transaction between the second fishing vessel (e.g., 145B) and the second transaction station (e.g., 160B).

At block 405, the first fishing vessel (e.g., 145A) can disconnect from its lead line 135 and move away from vessel 100 under its own power. At block 410, line hauler 105 pulls line 115 so that a second fishing vessel (e.g., 145B) is pulled to the location proximate the first location of the first transaction station (e.g., 160A), then stops pulling at block 415 given the second fishing vessel (e.g., 145B) is proximate the first location of the first transaction station (160A). At block 420, vessel 100 can conduct with the second fishing vessel (e.g., 145B) the same transaction (the "first transaction") previously conducted between vessel 100 and the first vessel (e.g., 145A) when it was located at the first transaction station.

Although the invention has been described and illustrated in the foregoing illustrative embodiments, it is understood that the present disclosure has been made only by way of example, and that numerous changes in the details of implementation of the invention can be made without departing from the spirit and scope of the invention, which is only limited by the claims that follow. Features of the disclosed embodiments can be combined and rearranged in various ways.

What is claimed is:

1. On a fish tender vessel, a fish processing facility, or a barge (hereinafter, "the vessel"), an apparatus, comprising:
   a power source;
   a line hauler mounted to the vessel and coupled to the power source by which to operate the line hauler;
   a line wrapped around the line hauler, then extending forward on the vessel to a pulley mounted on a respective port or starboard side of the vessel, then extending down to a surface of a body of seawater, then at least extending on the surface of the body of seawater adjacent the respective port or starboard side of the vessel to a position substantially below the location at which the line hauler is mounted to the vessel, and then extending from the surface of the body of seawater back to the line hauler, thereby forming a loop of line that moves along its length when the line hauler pulls the line; and
   a plurality of lead lines each having a first end coupled to the line and a second end removably coupled to a fishing vessel so that fishing vessels can be pulled alongside the respective port or starboard side of the vessel when the line hauler pulls on the line.

2. The apparatus of claim 1, further comprising a buoy coupled to each lead line.

3. The apparatus of claim 1, wherein the line at least extending on the surface of the body of seawater adjacent the respective port or starboard side of the vessel to the position substantially below the location at which the line hauler is mounted to the vessel comprises the line extending on the surface of the body of seawater adjacent the respective port or starboard side of the vessel to a location beyond the location at which the line hauler is mounted to the vessel, then looping around and extending on the surface of the body of seawater toward the respective port or starboard side of the vessel before extending from the surface of the body of seawater back to the line hauler.

4. The apparatus of claim 3, further comprising a floating boom coupled to a stern of the vessel to provide separation between that portion of the line extending on the surface of the body of seawater adjacent the respective port or starboard side of the vessel to the location beyond the location at which the line hauler is mounted to the vessel, and that portion of the line then looping around and extending on the surface of the body of seawater toward the respective port or starboard side of the vessel.

5. A method for pulling fishing vessels alongside a port or starboard side of a fish tender vessel, a fish processing facility, or a barge (hereinafter, "the vessel"), comprising:
   operating a line hauler, mounted to the vessel, under a motive power;
   moving a loop of line (hereinafter "the line") along its length by operation of the line hauler pulling the line, the line extending forward on the vessel to a pulley mounted on a respective port or starboard side of the vessel, then extending down to a surface of a body of seawater, then extending on the surface of the body of seawater adjacent the respective port or starboard side of the vessel, and then extending from the surface of the body of seawater back to the line hauler;
   coupling a plurality of lead lines via a first end of the respective lead line to the line; and
   coupling a plurality of fishing vessels to the lead lines via a second end of the respective lead line so that the fishing vessels are pulled alongside the respective port or starboard side of the vessel when the line hauler pulls on the line.

6. The method of claim 5, wherein moving a loop of line (hereinafter "the line") along its length by operation of the line hauler pulling the line, the line extending forward on the vessel to a pulley mounted on a respective port or starboard side of the vessel, then extending down to a surface of a body of seawater, then extending on the surface of the body of seawater adjacent the respective port or starboard side of the vessel, and then extending from the surface of the body of seawater back to the line hauler, comprises moving a loop of line (hereinafter "the line") along its length by operation of the line hauler pulling the line, the line extending forward on the vessel to a pulley mounted on a respective port or starboard side of the vessel, then extending down to a surface of a body of seawater, then extending on the surface of the body of seawater adjacent the respective port or starboard side of the vessel to a position substantially below the location at which the line hauler is mounted to the vessel, and then extending from the surface of the body of seawater back to the line hauler.

7. The method of claim 5, further comprising anchoring the vessel in the body of seawater, at a bow or foredeck of the vessel, to allow the vessel to pivot in, and thereby align with, a current of the body of seawater.

8. The method of claim 5, further comprising:
   positioning a first transaction station at a first location, and positioning a second transaction station at a second location that is a distance from the first location of the first transaction station, on the deck of the vessel between the pulley and the line hauler; and
   wherein coupling the plurality of lead lines via a first end of the respective lead line to the line comprises coupling the plurality of lead lines via the first end of the respective lead line to the line at substantially equal distances along a length of the line, wherein the distance from the first location of the first transaction station to the second location of the second transaction station is equal to, or a multiple of, the substantially equal distances along the length of the line.

9. The method of claim 8, wherein coupling the plurality of fishing vessels to the lead lines via the second end of the respective lead line so that the fishing vessels are pulled alongside the respective port or starboard side of the vessel when the line hauler pulls on the line comprises coupling first and second fishing vessels to respective lead lines via the second end of the respective lead line so that the first and second fishing vessels are concurrently proximate the respective first and second locations of the first and second transaction stations when the line hauler pulls on the line so that the fishing vessels are pulled alongside the respective port or starboard side of the vessel.

10. The method of claim 9, further comprising:
  stopping the line hauler from pulling on the line when the first and second fishing vessels are concurrently proximate the respective first and second locations of the first and second transaction stations; and
  conducting a first transaction between the first fishing vessel and the first transaction station, while the line hauler has stopped pulling on the line; and
  conducting, concurrently with the first transaction, a second transaction between the second fishing vessel and the second transaction station, while the line hauler has stopped pulling on the line.

11. The method of claim 10, further comprising:
  decoupling the first fishing vessel from its lead line via the second end of the lead line;
  pulling, by the line hauler, on the line, so that second fishing vessel is pulled to a location proximate the first location of the first transaction station;
  stopping the line hauler from pulling on the line when the second fishing vessel is proximate the first location of the first transaction station; and
  conducting a first transaction between the second fishing vessel and the first transaction station, while the line hauler has stopped pulling on the line.

12. The method of claim 11, further comprising the first fishing vessel moving under its own power away from the vessel after decoupling the first fishing vessel from its lead line via the second end of the lead line and before pulling, by the line hauler, on the line, so that second fishing vessel is pulled to a location proximate the first location of the first transaction station.

13. The method of claim 8, wherein the first and second transaction stations are selected from a group of transaction stations consisting of: a fish unloading station, a fuel loading station, and a provisions loading or unloading station.

* * * * *